(12) United States Patent
Krishnamoorthi (10) Patent No.: US 9,418,279 B2
(45) Date of Patent: Aug. 16, 2016

(54) DETECTION OF AN OBJECT'S VARYING FEATURES WITH A NON-STATIONARY DEVICE

(71) Applicant: QUALCOMM Incorporated, San Diego, CA (US)

(72) Inventor: Raghuraman Krishnamoorthi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 291 days.

(21) Appl. No.: 14/084,490

(22) Filed: Nov. 19, 2013

(65) Prior Publication Data

US 2015/0138330 A1    May 21, 2015

(51) Int. Cl.
 *H04N 7/18*   (2006.01)
 *G06K 9/00*   (2006.01)
 *G06T 7/00*   (2006.01)

(52) U.S. Cl.
 CPC .......... *G06K 9/00369* (2013.01); *G06T 7/0016* (2013.01); *G06T 2207/10016* (2013.01); *G06T 2207/10024* (2013.01); *G06T 2207/30076* (2013.01); *G06T 2207/30088* (2013.01); *G06T 2207/30196* (2013.01); *H04N 7/18* (2013.01)

(58) Field of Classification Search
 CPC .............. G06K 9/00369; G06T 2207/10016; G06T 2207/10024; G06T 2207/30076; G06T 2207/30088; G06T 2207/30196; G06T 7/0016; H04N 7/18
 USPC ........................................................... 348/77
 See application file for complete search history.

(56) References Cited

U.S. PATENT DOCUMENTS

| 2006/0140481 | A1 | 6/2006 | Kim et al. |
| 2010/0324437 | A1 | 12/2010 | Freeman et al. |
| 2011/0293142 | A1 | 12/2011 | Van Der Mark et al. |
| 2012/0141000 | A1 | 6/2012 | Jeanne et al. |
| 2013/0296660 | A1 | 11/2013 | Tsien et al. |

FOREIGN PATENT DOCUMENTS

| WO | 2010100593 A1 | 9/2010 | |
| WO | WO 2010/100593 | * 9/2010 | ......... G06K 9/00255 |

(Continued)

OTHER PUBLICATIONS

Chambino P B : "Android-based implementation of Eulerian Video Magnification for vital signs monitoring", Jul. 18, 2013, XP055164544, Faculdade De Engenharia Da Universidade Doporto, Portugal, 67 pgs. Retrieved from http:l/p.chambino.comldisserLation/pulse.pdf [retrieved on Jan. 23, 2015] 1.4, 2.2.2 Chapter 3 as shown in IDS.*

(Continued)

*Primary Examiner* — Thai Tran
*Assistant Examiner* — Syed Hasan
(74) *Attorney, Agent, or Firm* — Hunter Clark PLLC (57) ABSTRACT

Disclosed are systems, apparatus, devices, method, computer program products, media and other implementations, including a method that includes capturing by an image capturing unit of a mobile device images of a scene including a target object, determining motion of the mobile device, and detecting from the captured images variations in one or more varying features of the target object based, at least in part, on the determined motion of the mobile device, the variations in the one or more varying features being independent of the target object's position in the scene.

26 Claims, 5 Drawing Sheets

(56) References Cited

FOREIGN PATENT DOCUMENTS

WO  2012143842 A2  10/2012
WO  2013166341 A1  11/2013

OTHER PUBLICATIONS

Scheuermann B, et al., "Ego-motion compensated face detection on a mobile device", Computer Vision and Pattern Recognition Workshops (CVPRW), 2011 IEEE Computer Society Conference on, IEEE, Jun. 20, 2011, pp. 66-71, XP031926564, DOI: 10.1109/CVPRW.2011.5981810 ISBN: 978-1-4577-0529-8 abstract sections 1, 3, 5. as shown in IDS.*
Liu C, et al., "Motion magnification", ACM Transactions on Graphics, vol. 24, No. 3, Jul. 1, 2005, pp. 519-527. XP055153862, ISSN: 0730-0301. DO1:10.1145/1073204.1073223 abstract sections 3.1.4. as shown in IDS.*
Liu C, et al., "Motion magnification", ACM Transactions on Graphics, vol. 24, No. 3, Jul. 1, 2005, pp. 519-527. XP055153862, ISSN: 0730-0301. DOI:10.1145/1073204.1073223 abstract sections 3.1, 4.
Scheuermann B, et al., "Ego-motion compensated face detection on a mobile device", Computer Vision and Pattern Recognition Workshops (CVPRW), 2011 IEEE Computer Society Conference on, IEEE, Jun. 20, 2011, pp. 66-71, XP031926564, DOI: 10.1109/CVPRW.2011.5981810 ISBN: 978-1-4577-0529-8 abstract sections 1, 3, 5.
Wu H.Y., et al., "Eulerian Video Magnification for Revealing Subtle Changes in the World," ACM Transactions on Graphics, vol. 31, No. 4, Jul. 1, 2012, 4 pages. Retrieved from http://people.csail.mit.edu/fredo/tmp/vidmag.pdf [retrieved on Mar. 17, 2014].
Kwon S, et al., "Validation of heart rate extraction using video imaging on a built-in camera system of a smartphone", The Effect of Applied Compressive Loading on Tissue—Engineered Cartilage Constructs Cultured With TGF-BETA3, IEEE, Aug. 28, 2012, pp. 2174-2177, XP032463369, ISSN: 1557-170X, DOI: 10.1109/EMBC.2012.6346392 abstract section II.
Guha B, et al., "Detecting Pulse from Head Motions in Video", IEEE Computer Society Conference on Computer Vision and Pattern Recognition. Proceedings, IEEE Computer Society, U.S., Jun. 23, 2013. pp. 3430-3437, XP032492885, ISSN:1063-6919, DOI: 10.1109/CVPR.2013.440 [retrieved on Oct. 2, 2013] cited in the application the whole document.
Chambino P B : "Android-based implementation of Eulerian Video Magnification for vital signs monitoring", Jul. 18, 2013, XP055164544, Faculdade De Engenharia Da Universidade Doporto, Portugal, 67 pgs. Retrieved from http://p.chambino.com/dissertation/pulse.pdf [retrieved on Jan. 23, 2015] sections 1.4, 2.2.2 Chapter 3.
International Search Report and Written Opinion—PCT/US2014/062121—ISA/EPO—Feb. 5, 2015.
International Preliminary Report on Patentability—PCT/US2014/062121, European Patent Office—Munich, Germany, Oct. 28, 2015, 6 pgs.

* cited by examiner

DETECTION OF AN OBJECT'S VARYING FEATURES WITH A NON-STATIONARY DEVICE

BACKGROUND

Some mobile phone applications can also be used to measure a person's pulse rate by, for example, placing the finger on the top of the flash and the camera lens and tracking the variation in brightness. Other mobile phone applications can be used to measure a person's breathing rate by placing phone on the chest and breathing heavily.

SUMMARY

In some variations, a method is disclosed. The method includes capturing by an image capturing unit of a mobile device images of a scene including a target object, determining motion of the mobile device, and detecting from the captured images variations in one or more varying features of the target object based, at least in part, on the determined motion of the mobile device, the variations in the one or more varying features being independent of the target object's position in the scene.

Embodiments of the method may include at least some of the features described in the present disclosure, including one or more of the following features.

The one or more varying features of the target object may include one or more of, for example, small motion features occurring at a surface of the target object, and/or color changes occurring at the surface of the target object.

The method may further include determining one or more biometric characteristics associated with the one or more varying features of the target object.

The one or more varying features of the target object may include one or more of, for example, color changes of skin tissue due to blood flowing in blood vessels, and/or pulsating tissue, and the biometric characteristics associated with the one or more varying features of the target object may include one or more of, for example, a heart rate, blood pressure, and/or a respiratory rate.

Determining the motion of the mobile device may include tracking position of a stationary reference object appearing in the images captured by the image capturing unit, and determining the motion of the mobile device based on the tracked position of the stationary reference object in the captured images.

Detecting the variations in the one or more varying features of the target object based, at least in part, on the determined motion of the mobile device may include aligning at least two of the one or more captured images based on the tracked position of the stationary reference object, and determining the variations in the one or more varying features of the target object from the aligned two or more captured images.

Determining the motion of the mobile device may include obtaining one or more measurements from one or more sensors of the mobile device, and determining the motion of the mobile device based on the one or more measurements obtained from one or more sensors.

Detecting the variations in the one or more varying features of the target object may include determining a frame of reference of the image capturing unit of the mobile device, registering two or more of the captured images to the frame of reference of the image capturing unit of the mobile device, and processing the two or more of the captured images, registered to the frame of reference of the image capturing unit, to extract the variations in the one or more varying features of the target object.

Detecting the one or more varying features of the target object may include applying filtering processes to the one or more captured images to extract the variations in the one or more varying features.

Detecting the variations in the one or more varying features of the target object may include applying an Eulerian motion amplification process to two or more of the captured images, the two or more captured images aligned based on the determined motion of the mobile device, to extract the variations in the one or more varying features.

The Eulerian motion amplification process may include performing filtering operations on the two or more captured images to extract the variations in the one or more varying features, and amplifying the extracted variations in the one or more varying features.

In some variations, a device is disclosed that includes an image capturing unit, and a controller. The controller is configured to cause operations including capturing by the image capturing unit images of a scene including a target object, determining motion of the mobile device, and detecting from the captured images variations in one or more varying features of the target object based, at least in part, on the determined motion of the mobile device, the variations in the one or more varying features being independent of the target object's position in the scene.

Embodiments of the device may include at least some of the features described in the present disclosure, including at least some of the features described above in relation to the method.

In some variations, an apparatus is disclosed. The apparatus includes means for capturing images of a scene including a target object, means for determining motion of the apparatus, and means for detecting from the captured images variations in one or more varying features of the target object based, at least in part, on the determined motion of the apparatus, the variations in the one or more varying features being independent of the target object's position in the scene.

Embodiments of the apparatus may include at least some of the features described in the present disclosure, including at least some of the features described above in relation to the method and the device, as well as one or more of the following features.

The apparatus may further include means for determining one or more biometric characteristics associated with the one or more varying features of the target object. The one or more varying features of the target object may include one or more of, for example, color changes of skin tissue due to blood flowing in blood vessels, and/or pulsating tissue, and the biometric characteristics associated with the one or more varying features of the target object may include one or more of, for example, a heart rate, blood pressure, and/or a respiratory rate.

The means for determining the motion of the apparatus may include means for tracking position of a stationary reference object appearing in the images captured by the means for capturing, and means for determining the motion of the apparatus based on the tracked position of the stationary reference object in the captured images.

The means for determining the motion of the apparatus may include means for obtaining one or more measurements from one or more sensors of the apparatus, and means for determining the motion of the apparatus based on the one or more measurements obtained from one or more sensors.

The means for detecting the variations in the one or more varying features of the target object may include means for applying an Eulerian motion amplification process to two or more of the captured images, the two or more captured images aligned based on the determined motion of the apparatus, to extract the variations in the one or more varying features.

In some variations, a processor readable media is disclosed. The processor readable media is programmed with computer instructions executable on a processor that, when executed, cause operations including capturing by an image capturing unit of a mobile device images of a scene including a target object, determining motion of the mobile device, and detecting from the captured images variations in one or more varying features of the target object based, at least in part, on the determined motion of the mobile device, the variations in the one or more varying features being independent of the target object's position in the scene.

Embodiments of the processor-readable media may include at least some of the features described in the present disclosure, including at least some of the features described above in relation to the method, the device, and the apparatus.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "or" or "and" as used in a list of items prefaced by "at least one of" or "one or more of" indicates that any combination of the listed items may be used. For example, a list of "at least one of A, B, or C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, or C" (or "one or more of A, B, or C") may also include A, AA, AAB, AAA, BB, BCC, etc.

As used herein, including in the claims, unless otherwise stated, a statement that a function, operation, or feature, is "based on" an item and/or condition means that the function, operation, function is based on the stated item and/or condition and may be based on one or more items and/or conditions in addition to the stated item and/or condition.

Other and further objects, features, aspects, and advantages of the present disclosure will become better understood with the following detailed description of the accompanying drawings.

DETAILED DESCRIPTION

Described herein are systems, apparatus, devices, methods, computer program products, media and other implementations, including a method that includes capturing by an image capturing unit (e.g., a camera) of a device (e.g., a non-stationary mobile device, such as a mobile device), images of a scene including a target object (such as a person). The method also includes determining motion of the device, and detecting from the captured images variations in one or more varying features of the target object based, at least in part, on the determined motion of the device, with the variations in the one or more varying features being independent of the target object's position in the scene. The variations in the one or more varying features detected may include small motion variations occurring on the surface of the object such as, for example, pulsating tissue of a person, skin color changes, etc., with such variations being independent of global position (if any) undergone by the object. For example, small motion variations, such as pulsating tissue, occur whether or not the person moves and/or where in the scene the person happens to be located. In other words, the variations in the one or more varying features tracked and detected are variations occurring with respect to certain features of the target object rather than variations in the global position of the target object.

In some embodiments, and as will become apparent below, determining the motion of the mobile device (also referred to as a handheld device) may include tracking position of a stationary reference object appearing in multiple images captured by the image capturing unit, i.e., some reference point positioned at a fixed location in the scene (e.g., a lamp, a table, or any other object that generally is stationary during short-duration image capturing periods), and determining the motion of the device based on the tracked position of the reference object in the multiple captured images. That is, by tracking a reference object in several captured images during some period of time where the reference object is known to have remained stationary, or is presumed to have remained stationary, changes in the position of the reference object may be attributable to movement undergone by the mobile device. Thus, the captured images can be aligned, enabling small variations occurring at an object in the scene to be determined.

Figure 1:
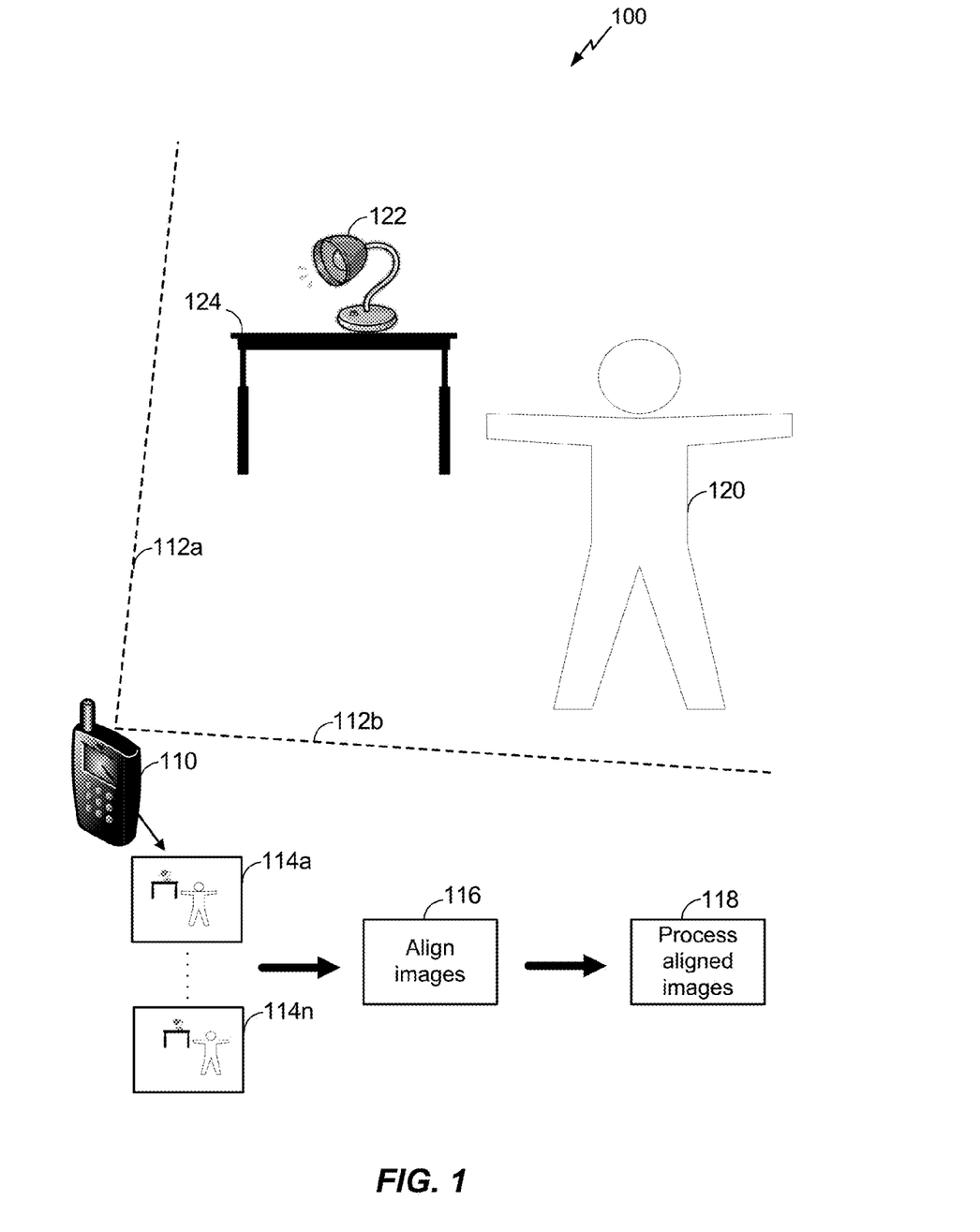
FIG. 1 is a diagram showing operations performed by a mobile device to capture and process images of a scene.

For example, and with reference to FIG. 1, an example scene 100 captured by an image capturing unit (e.g., a camera such as a charge-coupled device (CCD)) of a mobile device 110 is shown. The image capturing unit (not shown in this figure) is configured to automatically, or in response to activation by a user, capture images 114*a-n* of the scene (the image capturing unit's field of view is illustrated in FIG. 1 as the area between the dashed lines 112*a* and 112*b*). As depicted in FIG. 1, the scene captured includes a target object, such as a person 120, that includes features that exhibit small variations. For example, a person, even when not moving, will have his/her tissue surface area rise and fall in accordance with the person's breathing pattern and/or heartbeat. These small variations can be detected/determined from images captured by the image capturing unit (as will become apparent below), and biometric characteristics of the person (e.g., breathing rate, heart rate) corresponding to the detected/determined small variations can be computed.

The determination of small motion variations of features of a target object in a scene generally requires that the image capturing unit be still/stationary so that variations in the captured scene can be attributable to actual variations undergone by objects in the scene or by certain features of the objects (e.g., an object's small variations on its surface area). However, when using a mobile device equipped with an image capturing unit, jitters in the position of the mobile device (because the device cannot be maintained/held in a fixed stable position) cause changes/shifts in the positions of objects as they appear in the captured images of the scene. Thus, in some embodiments, the mobile device 110 (or some other remote server receiving data from the handheld unit) is configured to track the motion of the mobile device, and to align the captured images (as schematically represented by the block 116 in FIG. 1) so that actual motion occurring in the scene (be it small motion of varying features of an object, or global motion of one or more objects in the scene) can be determined. In some implementations, and as will be discussed in greater details below, the motion of the mobile device can be determined by tracking the position of a reference object that is generally known, or can be presumed, to be stationary, in different captured images, and aligning the different captured images based on the different positions of the tracked reference object. In the example scene 100 depicted in FIG. 1, the mobile device 110 may track a reference object such as a lamp 122 placed on a table 124. However, any other object that is known, or is presumed, to be stationary may serve as a reference object that can be tracked for the purpose of aligning different images captured by a mobile device prone to jitter and small scale movements. With the different images having been aligned, optical/visual variations associated with a target object being monitored (such as a non-moving person whose breathing rate and heart rate need to be monitored) can be attributed to varying features of the objects.

In some embodiments, determining motion undergone by the mobile device may be performed using onboard sensors (schematically shown, for example, in FIG. 3), e.g., inertial sensors (also referred to as orientation sensors), configured to measure motion of the device. Such inertial sensors may include, for example, an accelerometer, a gyroscope, a magnetometer, etc. Thus, in such embodiments, determining the motion of the mobile device may include obtaining one or more measurements from one or more device sensors, and determining the motion of the mobile device (e.g., its change in orientation relative to a previously determined orientation) based on the one or more measurements obtained from the one or more sensors. In some embodiments, the motion of the mobile device may be determined based on both the tracking of a reference object and measurements performed by one or more inertial sensors of the device. Other processes/techniques to determine the motion of the mobile device, based on which images captured by an image capturing unit of the device at different times may be aligned or otherwise correlated, may be used.

Based on the determined motion of the mobile device (such as the device 110 of FIG. 1), which enables alignment/correlation of different images captured by the device's image capturing unit at different times, variations in features of the target object that are independent of the object's global position are determined (e.g., as part of the processing operations schematically represented by the block 118 of FIG. 1). In some implementations, detecting the variations in the varying features of the object (e.g., variations in the position of pulsating surface area tissues, variations in the color of the surface area tissues, etc.) may include processing the images captured by the device's image capturing unit to extract the variations in the varying features. For example, such processing may include applying Eulerian motion amplification process(es), as will be described below in greater detail, to detect and/or extract the varying features. Other types of filtering processes/techniques may also be applied to the captured images to extract the variations in the varying features. Determining the variations in the varying features may include amplifying/magnifying such variations relative to other visual information contained in the images (e.g., increasing the amplitude of certain detected feature variations more than other features in the images). From the determined features, information associated with the determined features may be derived. For example, in embodiments in which variations in a person skin color (indicative of the pulse or blood pressure of the person), or small position variations of the person's skin surface (e.g., pulsations indicative of pulse or respiratory rate), the determined variations may be used to derive biometric characteristics of the person (e.g., pulse, respiratory rate, blood pressure, etc.)

Figure 2:
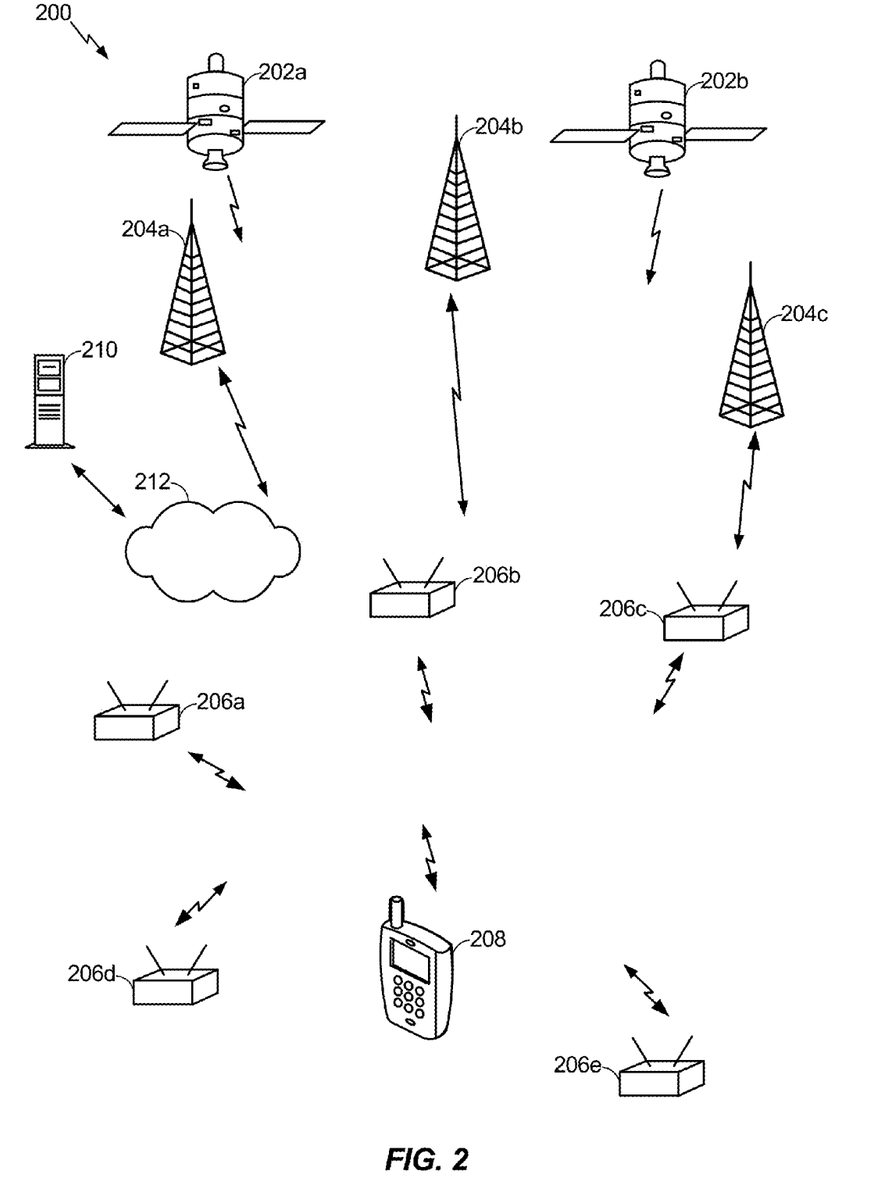
FIG. 2 is a schematic diagram of an example operating environment for a mobile device.

With reference to FIG. 2, a schematic diagram of an example operating environment 200 for a mobile device, such as a mobile device 208, is shown. The mobile device (also referred to as a wireless device or as a mobile station) 208 may be similar to the mobile device 110 depicted in FIG. 1, and may be configured to operate and interact with multiple types of other communication systems/devices, including local area network devices (or nodes), such as WLAN for indoor communication, femtocells, Bluetooth-based transceivers, other types of indoor communication network nodes, wide area wireless network nodes, satellite communication systems, etc., and as such the mobile device 208 may include one or more interfaces to communicate with the various types of communications systems. As used herein, communication systems/devices with which the mobile device 208 may communicate are also referred to as access points (AP's). The mobile device 208 may also be configured to determine its motion, and to detect variations in one or more varying features (e.g., small-scale motion) of a target object (which may otherwise be stationary) that are observable or detectable from images captured by the device's image capturing unit (even if the varying features are too small or subtle to be observed by an unaided eye). The device may also be configured to determine, based on the detected/determined variations of the features of the object being monitored, various parameters and values (e.g., values of biometric characteristics/parameters for a person being monitored with the device's image capturing unit). In some embodiments, at least some of the processing (e.g., determining the variations of an object's features from the captured images) may be performed by a remote server (e.g., server 210 depicted in FIG. 2) with which the device 208 may establish a communication link (e.g., via one or more of the communication nodes illustrated in FIG. 2).

As noted, the operating environment 200 may contain one or more different types of wireless communication systems or nodes. Such nodes, also referred to as wireless access points (or WAPs) may include LAN and/or WAN wireless transceivers, including, for example, WiFi base stations, femto cell transceivers, Bluetooth transceivers, cellular base stations, WiMax transceivers, etc. Thus, for example, and with continued reference to FIG. 2, the operating environment 200 may include Local Area Network Wireless Access Points (LAN-WAPs) 206a-e that may be used for wireless voice and/or data communication with the mobile device 208. The LAN-WAPs 206*a-e* may also be utilized, in some embodiments, as independents sources of position data, e.g., through implementation of trilateration-based procedures based, for example, on time of arrival or signal strength techniques. The LAN-WAPs 206*a-e* can be part of a Wireless Local Area Network (WLAN), which may operate in buildings and perform communications over smaller geographic regions than a WWAN. Additionally, in some embodiments, the LAN-WAPs 206*a-e* could also be pico or femto cells that are part of a WWAN network. In some embodiments, the LAN-WAPs 206*a-e* may be part of, for example, WiFi networks (802.11x), cellular piconets and/or femtocells, Bluetooth Networks, etc. The LAN-WAPs 206*a-e* can also form part of an indoor positioning system. Although five (5) LAN-WAP access points are depicted in FIG. 2, any number of such LAN-WAP's may be used, and, in some embodiments, the operating environment 200 may include no LAN-WAPs access points at all, or may include a single LAN-WAP access point. Furthermore, each of the LAN-WAPs 206*a-e* depicted in FIG. 2 may be a moveable node, or may be otherwise capable of being relocated.

As further shown in FIG. 2, the operating environment 200 may also include, in some embodiments, a plurality of one or more types Wide Area Network Wireless Access Points (WAN-WAPs) 204*a-c*, which may be used for wireless voice and/or data communication, and may also serve as another source of independent information through which the mobile device 208 may determine its position/location. The WAN-WAPs 204*a-c* may be part of wide area wireless network (WWAN), which may include cellular base stations, and/or other wide area wireless systems, such as, for example, WiMAX (e.g., 802.16), femtocell transceivers, etc. A WWAN may include other known network components which are not shown in FIG. 2. Typically, each WAN-WAPs 204*a*-204*c* within the WWAN may operate from fixed positions, and provide network coverage over large metropolitan and/or regional areas. Although three (3) WAN-WAPs are depicted in FIG. 2, any number of such WAN-WAPs may be used. In some embodiments, the operating environment 200 may include no WAN-WAPs at all, or may include a single WAN-WAP. Additionally, each of the WAN-WAPs 204*a-c* depicted in FIG. 2 may be a moveable node, or may otherwise be capable of being relocated.

Communication to and from the mobile device 208 (to exchange data, enable position determination of the device 208, etc.) may thus also be implemented, in some embodiments, using various wireless communication networks such as a wide area wireless network (WWAN), a wireless local area network (WLAN), a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may also be an IEEE 802.1 lx network, and a WPAN may be a Bluetooth network, an IEEE 802.15x, or some other type of network. The techniques described herein may also be used for any combination of WWAN, WLAN and/or WPAN.

In some embodiments, and as further depicted in FIG. 2, the mobile device 208 may also be configured to at least receive information from a Satellite Positioning System (SPS) 202*a-b*, which may be used as an independent source of position information for the mobile device 208. The mobile device 208 may thus include one or more dedicated SPS receivers specifically designed to receive signals for deriving geo-location information from the SPS satellites. Thus, in some embodiments, the mobile device 208 may communicate with any one or a combination of the SPS satellites 202*a-b*, the WAN-WAPs 204*a-c*, and/or the LAN-WAPs 206*a-e*.

As used herein, a mobile device or station (MS) refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device" or "wireless device") is also intended to include devices which communicate with a personal navigation device (PND), such as by short-range wireless, infrared, wireline connection, or other connection-regardless of whether satellite signal reception, assistance data reception, and/or position-related processing occurs at the device or at the PND. Also, "mobile station" is intended to include all devices, including wireless communication devices, computers, laptops, tablet devices, etc., which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile station." In some embodiments, the procedures described herein, including procedures to determine a device's motion, detect variations in features of an object appearing in one or more captured images based, at least in part, on the determined device motion, etc., may be performed by devices that do not have wireless functionality (e.g., functionality to wirelessly communicate with other remote devices).

Figure 3:
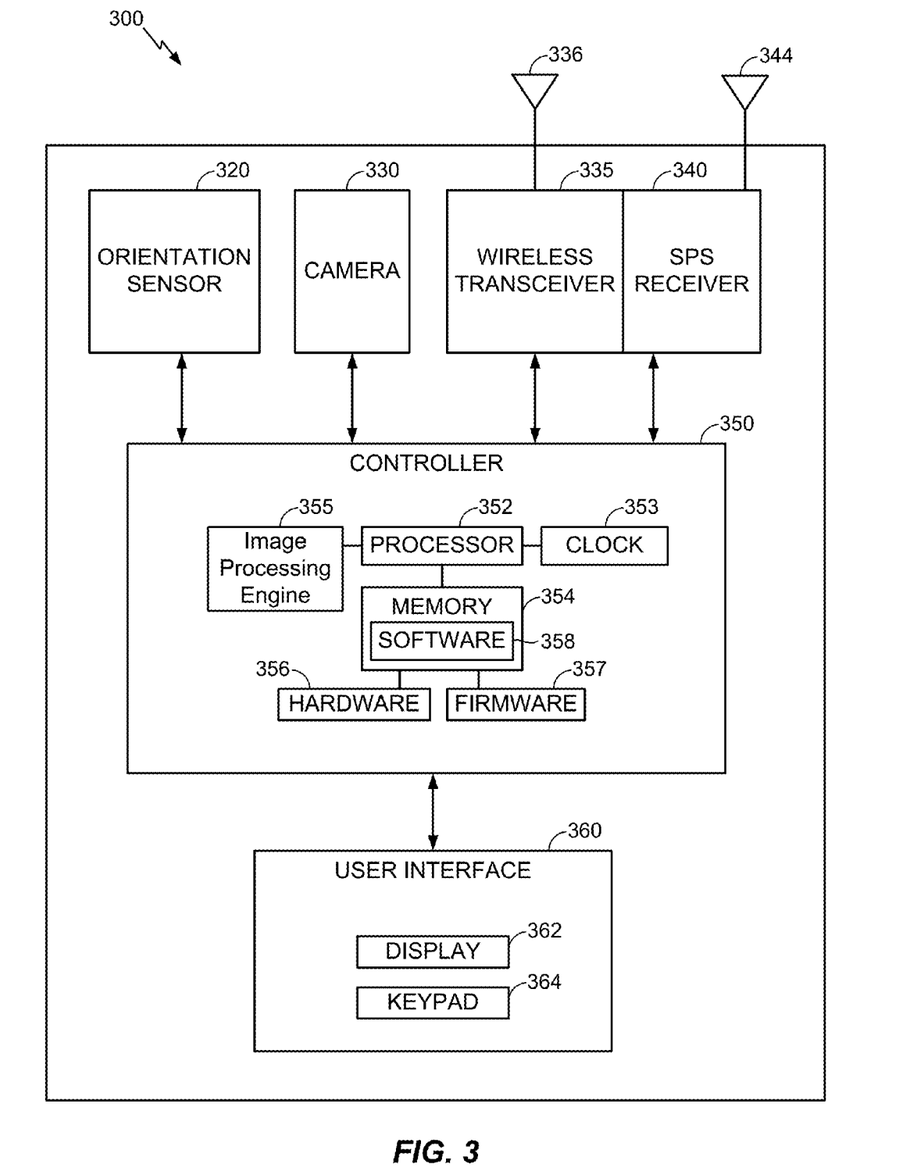
FIG. 3 is a block diagram of an example mobile device.

With reference now to FIG. 3, a block diagram of a mobile device 300, which may be similar to the devices 110 and/or 208 described in relation to FIGS. 1 and 2, respectively, is shown. As illustrated in FIG. 3, the mobile device 300 may include at least one orientation sensor (also referred to as spatial or inertial sensor) 320, which may be, e.g., a magnetometer, an accelerometer (e.g., a 3D accelerometer), a gyroscopes, etc. Although only one orientation sensor is depicted, additional sensors may be included with the device 300. The mobile station further includes an image capturing device, such as a camera 330 (e.g., a charge-coupled device (CCD)-type camera, CMOS-type camera, etc.), which may produce still or moving images (e.g., a video sequence) that may be displayed on a user interface device, such as a display or a screen.

The mobile device 300 may include a receiver 340, such as a satellite positioning system (SPS) receiver that receives signals from a SPS satellites (such as the satellites 202*a-b* of FIG. 2) via an antenna 344. The mobile device 300 may also include a wireless transceiver 335, which may be, e.g., a cellular modem or a wireless network radio receiver/transmitter configured to send and receive communications to and from one or more wireless access points (such as any of LAN-WAPs 206a-e and/or the WAN-WAPs 204a-c of FIG. 2), or with any other type of network node configured for wireless/cellular communication. Communication to and from the wireless transceiver may be enabled via a dedicated antenna 336, via the antenna 344, or via some other antenna. If desired, the mobile device 300 may include separate transceivers that serve as the cellular modem and the wireless network radio receivers/transmitters.

The at least one orientation sensor 320, the camera 330, the SPS receiver 340, and the wireless transceiver 335 are connected to, and communicate with, a controller 350. The controller 350 is configured to, for example, accept and process data from the at least one orientation sensor 320, the camera 330, the SPS receiver 340, and/or the wireless transceiver 335, and to control the operation of the various on-board units/modules of the device 300, as well as the general operation of the mobile device 300. The controller 350 may also be configured to process images captured by the camera 330, including, for example, to track position of a reference object, presumed or known to be stationary, appearing in the images, determine motion of the device based on the tracked position of the reference object, align or otherwise correlate captured images based on the determined motion of the device, detect variations in features of a target object (such feature variations being generally independent of the position of the object, which may be a stationary object), etc. The controller 350 may include, in some implementations, a processor 352 and associated memory 354, a clock 353, hardware 356, software 358, and firmware 357. The mobile station controller 350 may further include, in some embodiments, a dedicated image processing engine 355, which is illustrated separately from processor 352 for clarity, but which may constitute part of the processor 352. The image processing engine 355 is configured to process images and/or perform at least some of the operations of the procedures described herein. In some embodiments, at least some of the operations of the procedures described herein may be performed remotely from the mobile device 300. For example, some of image data for the images captured by the camera 330 may be communicated to a remote server (e.g., the server 210 of FIG. 1) in order to perform at least part of the image processing operations described herein at such a remote server.

The mobile device 300 also includes a user interface 360 that is in communication with the controller 350, e.g., the controller 350 may accept data and control the user interface 360. The user interface 360 includes a display 362 that may display images, including images produced by the camera 330. The display 362 may further display control menus and positional information. The user interface 360 further includes input interface devices, such as, for example, a keypad 364, a touch screen (not shown), a microphone and speaker (not shown), or other input device through which the user can input information into the mobile station 300.

Figure 4:
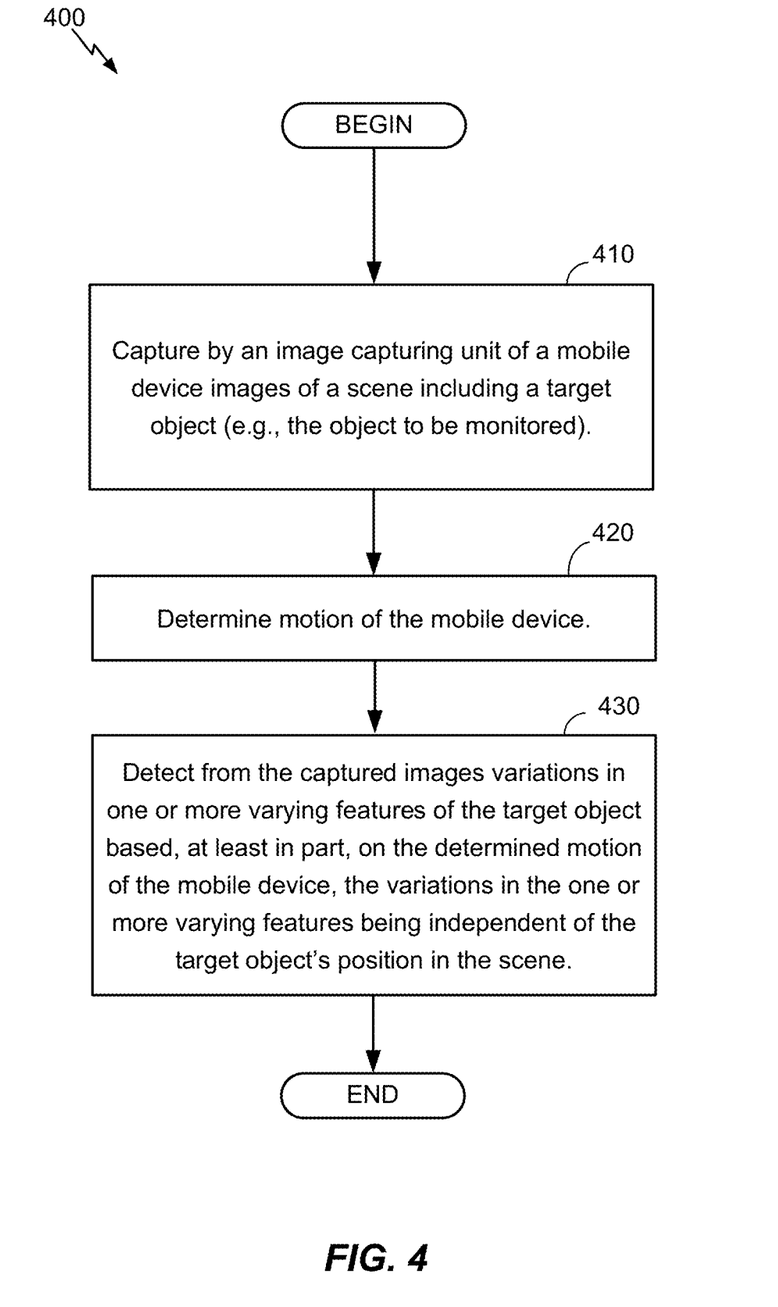
FIG. 4 is a flowchart of an example procedure to detect one or more varying features of an object in a scene.

With reference now to FIG. 4, a flowchart of an example procedure 400 to detect one or more varying features of an object is shown. The procedure 400 includes capturing 410, by an image capturing unit (e.g., a camera such as a CCD or CMOS camera), of a mobile device (such as the device 110, 208, or 300, shown in FIGS. 1, 2, and 3, respectively) images of a scene including a target object. Capturing images of a scene including the target object to be monitored may be performed at the discretion of the user carrying the mobile device, who may activate the image capturing unit. Alternatively and/or additionally, capturing the images may be initiated automatically in response to determining that some predetermined condition has been met or satisfied. For example, the image capturing unit may be activated: a) at some predetermined time, b) in response to receiving an identifying signal from a wireless device (such as an RFID tag) associated with the target object, c) in response to recognizing the object based on visual or audio information received by the mobile device, etc. In some embodiments, a screen display (such as the display 362 of the device 300 of FIG. 3) may present an image(s) taken with the device's camera to enable the user to properly point the camera at the desired target object. In some embodiments, the mobile device may include multiple cameras (e.g., a rear and front facing cameras, another camera located on one of its sides, etc.) to enable taking concomitantly multiple images, from which multiple target objects may be monitored.

As further shown in FIG. 4, the procedure 400 also includes determining 420 motion of the mobile device. As noted, a mobile device that is held by a user and pointed to the target object of interest (e.g., a patient whose biometric parameters are to be measured) may be subject to small movements, such as jitters, resulting in a change to the device's (and thus the device's onboard image capturing unit) orientation relative to the scene, a change in the device's distance from the scene, etc. Additionally and/or alternatively, the device may undergo even more significant movements, such as when the user holding the device deliberately moves to a different location. As a result, the motion/movement undergone by the device is determined so that images captured while the device was in different locations can be aligned.

In some implementations, the motion of the mobile device may be determined, at least in part, based on change in the device's orientation as measured through one or more inertial (orientation) sensors located on the mobile device. For example, the mobile device may include an accelerometer, such as a 3-D accelerometer implemented, in some embodiments, based on micro-electro-mechanical-system (MEMS) technology. In some embodiments, a 3-D accelerometer may be implemented using, for example, three (3) 1-D accelerometers. The device may include more than one 3-D accelerometer. An accelerometer is configured to sense/measure linear motion, i.e., translation in a plane, such as a local horizontal plane, that can be measured with reference to at least two axes. Such an accelerometer may also be configured to measure an object's tilt. Thus, with a 3D accelerometer, an object's motion in Cartesian coordinate space (x,y,z) can be sensed, as well as the direction of gravity, which indicates the downward direction for the accelerometer. In some embodiments, the device may also include a gyroscope sensor which may be implemented based on micro-electro-mechanical-system (MEMS) technology, and may be a single-axis gyroscope, a double-axis gyroscope, or a 3-D gyroscope configured to sense motion about, for example, three orthogonal axes. Other types of gyroscopes may be used in place of, or in addition to MEMS-based gyroscope. In some embodiments, the mobile device may further include a magnetometer configured to measure a magnetic field intensity and/or direction, and may, in some embodiments, measure absolute orientation with respect to the magnetic north (which can be converted to orientation with respect to true north). In some implementations, MEMS-based magnetometer may be used. Such MEMS-base sensors may be configured to detect motion caused by the Lorentz force produced by a current through a MEMS conductor. Other types of magnetometers, including such magnetometer as, for example, hall effect magnetometers, rotating coil magnetometers, etc., may also be used in implementations of the mobile device in place of, or in addition to, the MEMS-based implementations. The mobile device may include other types of sensor devices.

Thus, based on measurements obtained using one or more inertial sensors, the motion undergone by the mobile device (e.g., the motion undergone during the interval between two consecutive image captured by the device's image capturing unit) may be determined That determined motion may include the distance traveled during that interval, the relative change in orientation, etc. It is to be noted that, in some embodiments, it may not be necessary to know the absolute location or orientation of the device. Rather, in such embodiments, only the change in orientation or the distance travelled by the device during the interval between, for example, consecutive image captures, needs to be determined in order to align a later captured image with an earlier captured image.

In some embodiments, images are aligned by computing a homography between a reference image and subsequent images. A homography matrix may be estimated based on correspondences between feature points by a tracker. Alternatively, the homography matrix may be computed from the rotation and translation matrices estimated by the sensors (e.g., provided the plane normal for the image is known). The plane normal can be estimated from the feature correspondences by the tracker. Once this information is available, observations from the tracker and sensors can be combined using, for example, a Kalman filter to estimate the camera's pose. Thus, given a rotation matrix R, a translation matrix T, and the plane normal n, the homography matrix is given by:

$$H = R + (1/d)nT',$$

where d is the distance to the plane and can be set to 1 without loss of generality, and T' is the transposed translation matrix.

As noted, in some embodiments, the motion undergone by the mobile device may be determined by tracking a reference object in the scene that is known, or is presumed, to be stationary. Thus, changes in the position of the reference object can be attributed to motion by the device. The change in the position, orientation, and/or dimensions of the reference object from a first captured image to a second, subsequently, captured image, can therefore be used to re-align the reference object, and therefore to align the entirety of the second image with the first image. In some embodiments, the tracking of a reference object can be performed by identifying easily-recognizable points on features of the reference object. The reference object may be known in advance to the device. Alternatively and/or additionally, in some embodiments, the user operating the mobile device may identify (e.g., through a touchscreen or some other input interface) the reference object to be tracked. The object to be tracked can thus be dynamically selected. In some embodiments, more than one reference object may be identified and tracked. Other ways and processes to identify appropriate points in the tracked object(s) may also be used.

In some embodiments, once reference points of the reference object(s) have been identified in coordinate systems of the first image and of the second image (note, however, that more than two images may be used), the coordinates of those points, at each of the image coordinate systems, can be used to derive a transformation matrix, T, that would transform the second image from its coordinate system to the coordinate system of the first image, thus enabling alignment of stationary objects in the second image of the scene with those same stationary objects as they appear in the first captured image of the scene. In some implementations, the derivation of the transformation matrix T may be performed by solving for the parameters of the transformation matrix T that map the coordinates of the reference points in the second image to the coordinates of the same references points as they are expressed in the coordinate system of the first image.

Turning back to FIG. 4, as shown, with images of the scene captured, and the motion of the mobile device determined, variations in one or more varying features of the object (e.g., small motion occurring at the surface of the object, color changes, etc.), that are independent of the target object's position in the scene, are detected 430 from the captured images based, at least in part, on the determined motion of the device. As noted, in some implementations, the determined motion of the mobile device is used to align captured images with a reference image (e.g., an earlier captured image), or to otherwise determine a first frame of reference corresponding to a first captured image, and register frames of reference of other captured images to the first frame of reference. With the alignment of at least some of the captured images, image processing operations (e.g., filtering operations) are applied to the aligned images to isolate and/or extract the one or more varying features of the monitored target object that are independent of the position (relative or absolute) of the object. In situations where the monitored object is a person, biometric characteristics of the person (e.g., heart rate, breathing rate, etc.) may be determined from the determined variations in varying features of the object. For example, human skin color generally varies with blood circulation, and thus, color variations, determined from one or more captured images of a person, may be used to determine the person's heart rate.

In some implementations, processing of the one or more captured images (e.g., once the images have been aligned) may include a combination of spatial and temporal processing in which a sequence of images may be decomposed into different spatial frequency bands (e.g., to take into account the fact that different spatial frequency bands may have different signal-to-noise ratios, and the fact that various linear approximations used during temporal processing may be proper for some bands but may not be proper for other bands). Decomposing the image into different frequency bands may be performed, in some embodiments, through spatial filtering operations (e.g., low-pass filtering), which, in some embodiments, may be followed by down-sampling operations.

Once decomposed into different spatial frequency band, temporal processing may be applied to the various decomposed bands (temporal filtering may, in some situations, approximate spatial translation). In some embodiments, the same temporal processing is applied to the various bands. For example, the same temporal filter (e.g., a temporal bandpass filter) may be applied to all the spatial frequency bands. In such embodiments, the pixel values for the various bands of the various images may be represented using a temporal function approximation (e.g., a Taylor series approximation), to which a temporal filter can then be applied. The temporal filter used may depend on the specific property that is to be observed/determined. For example, if the property to be determined is the pulse rate of a person (to be determined from varying features, such as skin color or skin pulsation, occurring at the person's face or arm), the temporal bandpass filter to be applied may filter at a frequency range of 0.4-4 Hz (corresponding to 24-240 beats per minute). In some embodiments, different filtering operations may be applied to different bands.

In some embodiments, after applying temporal filtering operations to the various spatial frequency bands, the resultant signals may be amplified by particular amplification factor associated with the particular bands. Thus, in some embodiments, bands that have better signal to noise ratio, or for which the temporal function approximation is more appropriate, can be amplified by a larger factor than bands with a poorer signal-to-noise ratio or for which the temporal signal function approximation is not entirely accurate. The temporal processing that includes the temporal filtering and amplification operations are also referred to as Eulerian processing.

In some embodiments, the resultant amplified temporal signals in the various spatial bands are added back to the respective components that were removed from the band signals through the temporal filtering operations, and the resulting added signals (each now including the amplified temporal filtered signal and the component removed through the temporal filtering) are combined to generate a resultant signal in which the small feature variations that are to be detected/determined have been amplified.

As an example of Eulerian processing, consider a signal of a particular band whose intensity I(x,t) for a particular location x at a particular time t is represented as:

$$I(x,t) = f(x + \delta(t))$$

where δ(t) is a displacement function.

Assuming the image can be represented as a first order Taylor series, I(x,t) can be represented as:

$$I(x, t) \approx f(x) + \delta(t) \frac{\partial f(x)}{\partial x}$$

Applying a bandpass filter to the signal I(x,t) to remove f(x) results in the signal $$B(x, t) = \delta(t) \frac{\partial f(x)}{\partial x},$$

which is then amplified by a factor α (which may a variable factor that depends on the particular spatial band in question), and adding the amplified signal to the original signal I(x,t) provides the processed signal:

$$\tilde{I}(x, t) \approx f(x) + (1 + \alpha)\delta(t) \frac{\partial f(x)}{\partial x}$$

in which the displacement function δ(t) has thus been magnified.

Further processing may subsequently be applied to the generated combined resultant signal to determine the desired properties that are to be determined (e.g., pulse or breathing rate, when the target object monitored with the image capturing unit of the mobile device is a person, or some area of the person, like the person's head or arms). For example, the resultant image may be processed to analyze and determine the number of cycles of varying features appearing in the resultant image that occur within some time period (e.g., how many cycles of the varying skin color occur in one (1) minute, which is indicative of the monitored person's pulse rate). In some embodiments, the properties to be determined may be derived from one or more of the individual amplified signals (amplified relative to other visual information contained in the images) corresponding to one or more of the bands (i.e., without generating a resultant composite image by adding the original signal components of the decomposed bands and/or combining the resultant band signals into a single resultant image). Additional details regarding Eulerian image processing are provided, for example, in "Eulerian Video Magnification for Revealing Subtle Changes in the World," by H. Y Wu et al., published in ACM Transactions on Graphics (TOG), SIGGRAPH 2012, Conference Proceedings, Volume 31 Issue 4, Article No. 65, July 2012, the contents of which is incorporated herein by reference in its entirety. Another procedure to amplify small motions in an object is described in "Detecting Pulse From Head Motions in Video" by Guha Balakrishnan et al., CVPR 2013, the contents of which is incorporated herein by reference in its entirety.

In some embodiments, other types of processing to enable determination/detection of varying features of an object may also be used. For example, processing based on obtaining a photo-plethysmography signals, from which biometric parameters may be determined, may be implemented. Further details of such processing is provided in, for example, "Remote plethysmographic imaging using ambient light," by W. Verkruysse et al., published in Optics Express, Vol. 16, Issue 26, pp. 21434-21445 (2008), the contents of which is incorporated herein by reference in its entirety.

The various procedures and operations described herein, including procedures to perform motion determination for a mobile device, operations to detect variations in one or more varying features of an object (from which properties/values, such as biometric parameters, may be determined), etc., may be facilitated by one or more processor-based computing systems. Thus, with reference to FIG. 5, a schematic diagram of an example computing system 500 is shown. One or more of the devices, servers, and/or systems described herein (e.g., anyone of the devices, access points, or server shown in FIG. 2) may be realized, at least partly, using part or all of a computing system that may be similar to the example computing system 500.

Figure 5:
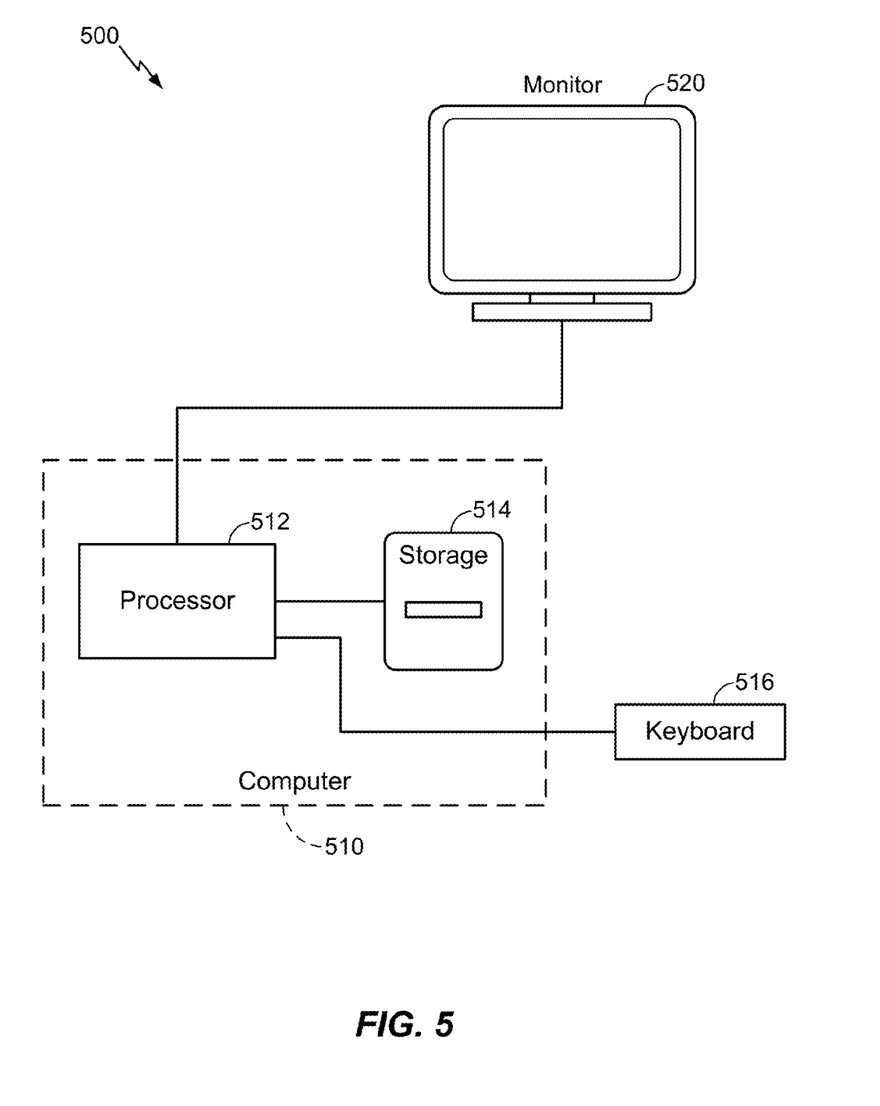
FIG. 5 is a schematic diagram of an example computing system.

The computing system 500 includes a processor-based device 510 such as a personal computer, a specialized computing device, and so forth, that typically includes a central processor unit 512. In addition to the CPU 512, the system includes main memory, cache memory and bus interface circuits (not shown). The processor-based device 510 may include a mass storage device 514, such as a hard drive and/or a flash drive associated with the computer system. The computing system 500 may further include a keyboard, or keypad, 516, and a monitor 520, e.g., a CRT (cathode ray tube) or LCD (liquid crystal display) monitor, that may be placed where a user can access them (e.g., a mobile device's screen).

The processor-based device 510 is configured to facilitate, for example, the implementation of the procedures described herein (in some embodiments, some of the procedures' operations may be performed at a first device, such as a mobile device, while other of the procedures' operations may be performed at a system in communication with the mobile device). The mass storage device 514 may thus include a computer program product that when executed on the processor-based device 510 causes the processor-based device to perform operations to facilitate the implementation of the procedures described herein. The processor-based device may further include peripheral devices to enable input/output functionality. Such peripheral devices may include, for example, a CD-ROM drive and/or flash drive, or a network connection, for downloading related content to the connected system. Such peripheral devices may also be used for downloading software containing computer instructions to enable general operation of the respective system/device. Alternatively and/or additionally, in some embodiments, special purpose logic circuitry, e.g., an FPGA (field programmable gate array), a DSP processor, or an ASIC (application-specific integrated circuit) may be used in the implementation of the computing system 500. Other modules that may be included with the processor-based device 510 are speakers, a sound card, a pointing device, e.g., a mouse or a trackball, by which the user can provide input to the computing system 500. The processor-based device 510 may include an operating system.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Some or all of the subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an embodiment of the subject matter described herein), or any combination of such back-end, middleware, or front-end components. The components of the system may be interconnected by any form or medium of digital data communication, e.g., a communication network. Examples of communication networks include a local area network ("LAN"), a wide area network ("WAN"), and the Internet.

The computing system may include clients and servers. A client and server are generally remote from each other and typically interact through a communication network. The relationship of client and server generally arises by virtue of computer programs running on the respective computers and having a client-server relationship to each other.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method comprising:
capturing by an image capturing unit of a mobile device images of a scene including a target object;
tracking a position of a stationary reference object appearing in the images captured by the image capturing unit;
determining a motion of the mobile device based on the tracked position of the stationary reference object in the captured images; and
detecting from the captured images variations in one or more varying features comprising small motion variations occurring on a surface of the target object based, at least in part, on the motion of the mobile device determined based on the tracked position of the stationary reference object in the captured images, the variations in the one or more varying features comprising the small motion variations occurring on the surface of the target object being independent of a target object position of the target object in the scene.

2. The method of claim 1, wherein the one or more varying features of the target object further comprise color changes occurring at the surface of the target object.

3. The method of claim 2, further comprising:
determining one or more biometric characteristics associated with the one or more varying features of the target object.

4. The method of claim 3, wherein the one or more varying features of the target object comprise one or more of: color changes of skin tissue due to blood flowing in blood vessels, or pulsating tissue, and wherein the biometric characteristics associated with the one or more varying features of the target object comprise one or more of: a heart rate, blood pressure, or a respiratory rate.

5. The method of claim 1, wherein detecting the variations in the one or more varying features of the target object based, at least in part, on the determined motion of the mobile device comprises:
aligning at least two of the one or more captured images based on the tracked position of the stationary reference object; and
determining the variations in the one or more varying features of the target object from the aligned two or more captured images.

6. The method of claim 1, wherein determining the motion of the mobile device comprises:
- obtaining one or more measurements from one or more sensors of the mobile device; and
- determining the motion of the mobile device based on the one or more measurements obtained from one or more sensors.

7. The method of claim 1, wherein detecting the variations in the one or more varying features of the target object comprises:
- determining a frame of reference of the image capturing unit of the mobile device;
- registering two or more of the captured images to the frame of reference of the image capturing unit of the mobile device; and
- processing the two or more of the captured images, registered to the frame of reference of the image capturing unit, to extract the variations in the one or more varying features of the target object.

8. The method of claim 1, wherein detecting the one or more varying features of the target object comprises:
- applying filtering processes to the one or more captured images to extract the variations in the one or more varying features.

9. The method of claim 1, wherein detecting the variations in the one or more varying features of the target object comprises:
- applying an Eulerian motion amplification process to two or more of the captured images, the two or more captured images aligned based on the determined motion of the mobile device, to extract the variations in the one or more varying features.

10. The method of claim 9, wherein the Eulerian motion amplification process comprises:
- performing filtering operations on the two or more captured images to extract the variations in the one or more varying features; and
- amplifying the extracted variations in the one or more varying features.

11. A mobile device comprising:
- an image capturing unit; and
- a controller configured to cause operations comprising:
  - capturing by the image capturing unit images of a scene including a target object;
  - tracking a position of a stationary reference object appearing in the images captured by the image capturing unit;
  - determining a motion of the mobile device based on the tracked position of the stationary reference object in the captured images; and
  - detecting from the captured images variations in one or more varying features comprising small variations occurring on a surface of the target object based, at least in part, on the motion of the mobile device determined based on the tracked position of the stationary reference object in the captured images, the variations in the one or more varying features comprising the small motion variations occurring on the surface of the target object being independent of a target object position of the target object in the scene.

12. The mobile device of claim 11, wherein the controller is further configured to cause further operations comprising:
- determining one or more biometric characteristics associated with the one or more varying features of the target object, the one or more varying features of the target object further comprising color changes of skin tissue due to blood flowing in blood vessels, wherein the biometric characteristics associated with the one or more varying features of the target object comprise one or more of: a heart rate, blood pressure, or a respiratory rate.

13. The mobile device claim 11, wherein determining the motion of the mobile device comprises:
- obtaining one or more measurements from one or more sensors of the mobile device; and
- determining the motion of the mobile device based on the one or more measurements obtained from one or more sensors.

14. The mobile device claim 11, wherein detecting the variations in the one or more varying features of the target object comprises:
- applying an Eulerian motion amplification process to two or more of the captured images, the two or more captured images aligned based on the determined motion of the mobile device, to extract the variations in the one or more varying features.

15. The mobile device of claim 14, wherein the Eulerian motion amplification process comprises:
- performing filtering operations on the two or more captured images to extract the variations in the one or more varying features; and
- amplifying the extracted variations in the one or more varying features.

16. An apparatus comprising:
- means for capturing images of a scene including a target object;
- means for tracking a position of a stationary reference object appearing in the images captured by the means for capturing images;
- means for determining a motion of the apparatus based on the tracked position of the stationary reference object in the captured images; and
- means for detecting from the captured images variations in one or more varying features comprising small motion variation s occurring on a surface of the target object based, at least in part, on the motion of the apparatus determined based on the tracked position of the stationary reference object in the captured images, the variations in the one or more varying features comprising the small motion variations occurring on the surface of the target object being independent of a target object position of the target object in the scene.

17. The apparatus of claim 16, further comprising:
- means for determining one or more biometric characteristics associated with the one or more varying features of the target object, the one or more varying features of the target object further comprising color changes of skin tissue due to blood flowing in blood vessels, wherein the biometric characteristics associated with the one or more varying features of the target object comprise one or more of: a heart rate, blood pressure, or a respiratory rate.

18. The apparatus of claim 16, wherein the means for determining the motion of the apparatus comprises:
- means for obtaining one or more measurements from one or more sensors of the apparatus; and
- means for determining the motion of the apparatus based on the one or more measurements obtained from one or more sensors.

19. The apparatus of claim 16, wherein the means for detecting the variations in the one or more varying features of the target object comprises:
- means for applying an Eulerian motion amplification process to two or more of the captured images, the two or more captured images aligned based on the determined motion of the apparatus, to extract the variations in the one or more varying features.

20. The apparatus of claim 19, wherein the Eulerian motion amplification process comprises:
performing filtering operations on the two or more captured images to extract the variations in the one or more varying features; and
amplifying the extracted variations in the one or more varying features.

21. A non-transitory processor readable media programmed with computer instructions executable on a processor that, when executed, cause operations comprising:
capturing by an image capturing unit of a mobile device images of a scene including a target object;
tracking a position of a stationary reference object appearing in the images captured by the image capturing unit;
determining a motion of the mobile device based on the tracked position of the stationary reference object in the captured images; and
detecting from the captured images variations in one or more varying features comprising small motion variations occurring on a surface of the target object based, at least in part, on the motion of the mobile device determined based on the tracked position of the stationary reference object in the captured images, the variations in the one or more varying features comprising the small motion variations occurring on the surface of the target object being independent of a target object position of the target object in the scene.

22. The processor readable medium of claim 21, further comprising instructions that, when executed, cause further operations comprising:
determining one or more biometric characteristics associated with the one or more varying features of the target object, the one or more varying features of the target object further comprising color changes of skin tissue due to blood flowing in blood vessels, wherein the biometric characteristics associated with the one or more varying features of the target object comprise one or more of: a heart rate, blood pressure, or a respiratory rate.

23. The processor readable medium of claim 21, wherein detecting the variations in the one or more varying features of the target object based, at least in part, on the determined motion of the mobile device comprises:
aligning at least two of the one or more captured images based on the tracked position of the stationary reference object; and
determining the variations in the one or more varying features of the target object from the aligned two or more captured images.

24. The processor readable medium of claim 21, wherein determining the motion of the mobile device comprises:
obtaining one or more measurements from one or more sensors of the mobile device; and
determining the motion of the mobile device based on the one or more measurements obtained from one or more sensors.

25. The processor readable medium of claim 21, wherein detecting the variations in the one or more varying features of the target object comprises:
applying an Eulerian motion amplification process to two or more of the captured images, the two or more captured images aligned based on the determined motion of the mobile device, to extract the variations in the one or more varying features.

26. The processor readable medium of claim 25, wherein the Eulerian motion amplification process comprises:
performing filtering operations on the two or more captured images to extract the variations in the one or more varying features; and
amplifying the extracted variations in the one or more varying features.

* * * * *